United States Patent Office 2,699,488
Patented Jan. 11, 1955

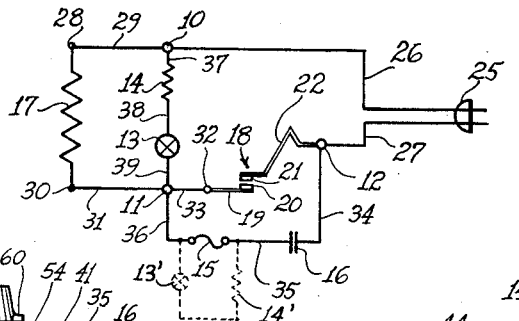

2,699,488

AQUARIUM IMMERSION TYPE HEATER WITH AUTOMATIC TEMPERATURE CONTROL

Henry M. Arak and Milton J. Weitzman, Brooklyn, N. Y., assignors to Aqua-Life Products Corp., Brooklyn, N. Y.

Application August 24, 1954, Serial No. 451,793

6 Claims. (Cl. 219—41)

This invention relates generally to improvements in electric water heaters and more particularly to thermostat controlled electric immersion type water heaters used for heating and controlling the temperature of water in aquariums and tanks.

It is a primary object of the present invention to provide an aquarium immersion type heater having a combination of components and of such design which will eliminate or correct the danger of heaters presently in use.

The immersion type heater to which the invention appertains conventionally comprises a rigid electrical insulating housing having engaging top and bottom portions, the top portion of which contains a pilot lamp and a capacitor and threadedly engages an adjusting screw; the bottom portion of which supports a tube open at top and communicates with the latter. Secured to the top portion of the housing is the upper portion of an insulating mounting for a thermostat operated switch unit, this unit projecting within the tube and being electrically connected to a heater unit located in the tube below the switch unit. The switch unit which is a temperature responsive switch is employed to control the heater comprises generally an adjustable springy switch member and a bi-metal switch member having contact buttons or points. When the two switch members are in contact an electric circuit is completed and the heater element will function and heat the water in the aquarium. When the heat of the water reaches the predetermined desired temperature, the space or air gap between the contact points is regulated such that a drop in the temperature of the water will cause the contact points to reengage thus closing the electric circuit and energizing the heater element and raise the temperature of the water to the predetermined desired value.

Some of the aquarium immersion heaters now in use have a condenser connected across the thermostat controlled switch to eliminate or suppress noises of radio frequency caused by the arcing at the contact points of the temperature responsive switch. This condenser, if it breaks down presents an alternate path for the electric current to flow whether or not the contact points are open or closed and thus, because the condenser is shorted, the heating unit will be in constant operation. This results in the water being heated in a very short time to a temperature higher than that at which the fish in the aquarium may survive.

It is, therefore, a further object of the present invention to connect in series with the said condenser a fuse of such value that it will pass the normal amount of current that flows through the condenser, but will blow out if the condenser is shorted and the contact points of the temperature responsive switch are separated, and thus interrupt the condenser circuit and prevent the entire heater load from passing through the condenser circuit. Blowing out of the fuse opens the alternate path for the electric circuit and the heater will now only operate when the temperature of the water in the aquarium drops below the predetermined or desired temperature.

Now, if the condenser should short, and the fuse should blow out, the heater would operate normally, but there would be objectionable radio and television interference and, thus, the aquarium possessor, if he has such sets, would know that the condenser is shorted and the fuse blown out and he could then easily replace them. If the condenser and fuse are not replaced, the heater would still function without the danger of the fish in the tank being killed.

However, it is another object of the present invention to provide in the electric circuit indicating means, such as a pilot light and resistor to signal if the fuse is blown out.

A still further object of the present invention is to provide an efficient pilot light that will enable the aquarium possessor to easily determine if the heater is in operation.

Another object of the present invention is to uniquely and firmly mount the aforementioned adjustable springy switch member at the top of the thermostat unit so that the pressure of the said member while being adjusted, will not distort the thermostat mounting and so that any constant strain in the mounting is eliminated which otherwise might cause inaccuracy of performance or premature failure in the functioning of the thermostat unit; another object being to make the said springy switch member flexible and enduring.

It is yet another object of the present invention to design the upper part of the device such that it will form with the tube containing the heater unit and in which the thermostat unit projects, a shockproof, firm and rigid connection.

Other features of the immersion type heater embodying the invention are as follows:

The top portion of the housing is provided with three bosses which press against the top of the tube and thereby hold the tube in place firmly and compresses the tube against a rubber gasket which seats in the bottom portion of the housing and thereby facilitate making the device waterproof.

The adjustable springy switch member is formed with a small semi-circular portion imparting more flexibility to the member, taking up any strain placed on the member by the adjusting screw and thereby eliminating the use of a rivet otherwise used to hold the member and its electrical contact, which rivet frequently works loose. The springy switch member fits into a V-shaped recess and being force fitted therein.

The upper or top portion of the housing is so designed as to enable, together with a recess formed in the top of the thermostat switch mounting, a conventional nut to be maintained in fixed position against turning, the nut being used for threadedly receiving the thermostat adjusting screw.

The bottom portion of the housing is fitted with an easily adjusted thumb screw and other parts to enable the heater to be easily mounted in proper position on the aquarium.

The knob of the adjusting screw is fitted with a pointer to enable the user to determine easily the relative position of the adjusting screw.

The pilot light for the heating element is placed in such a position in the top portion of the housing so that it is readily visible through an appropriate opening therein.

Many commercially available and easily replaceable parts have been employed which can be secured in the open market enabling the heater to be economically produced and thus be within the financial reach of the consumer.

The bi-metal switch member used in the thermostat has been designed so as to eliminate strains therein, which strains would tend to cause inaccuracies in the performance of the thermostat.

The Nichrome heating element makes contact with elements made of steel rather than brass, thereby eliminating premature burnouts due to electrolytic action, and the ceramic base on which the heating element is mounted is cushioned against shock in the tube by interposing a fiberglass pad between it and the bottom of the tube. This feature also prevents breakage of the tube during transportation.

The above and further objects and advantageous features will be apparent from the following description taken in connection with the accompanying drawing and in which:

Fig. 1 is a wiring diagram of electrical connections related to the invention;

Fig. 2 is a longitudinal section of an electric water heater of the immersion type according to the invention;

Fig. 3 is a sectional view taken on line 3—3 of Fig. 2; and

Fig. 4 is a bottom sectional view taken on line 4—4 of Fig. 2.

Referring to Fig. 1 of the drawing, there is disclosed an electric circuit diagram comprising the terminals 10, 11 and 12; a pilot light 13 in series with a resistor 14; both light 13 and resistor 14 being connected across terminals 10 and 11; a fuse 15 connected in series with a condenser or capacitor 16, the fuse 15 and condenser 16 being connected across terminals 11 and 12; an adjustable thermostat switch unit 18 having the bi-metal strip 19 terminating in contact button or point 20, the latter adapted to contact with the contact button or point 21, the latter being part of an angularly shaped springy switch member 22 connected to terminal 12, the member 19 being connected to terminal 11. Thus, the thermostat switch unit is connected across terminals 11 and 12. Plug 25 connects with the power supply line, one terminal of which through lead 26 is connected to terminal 10, while its other terminal is connected through lead 27 to terminal 12. One terminal 28 of heater element 17 is connected through lead 29 to terminal 10, while its other terminal 30 is connected through lead 31 to terminal 11. The springy switch member 22 of the thermostat switch unit 18 is connected to terminal 12, while the terminal 32 of its bi-metal switch member 19 is connected by lead 33 to terminal 11. One terminal of capacitor or condenser 16 is connected through lead 34 to terminal 12, while the other terminal of the condenser 16 is connected through lead 35 to one terminal of fuse 15, the other terminal of fuse 15 being connected through lead 36 to terminal 11. As shown in dotted lines in Fig. 1, there may be connected across the fuse 15 a pilot lamp 13' and resistor 14', the lamp 13' and resistor 14' being connected in series and both in parallel across the fuse 15. This pilot light or lamp will indicate if the fuse 15 and condenser 16 are not functioning, that is, it will indicate if the fuse is blown out and the condenser shorted. One terminal of resistor 14 is connected through lead 37 to terminal 10, while the other terminal of resistor 14 is connected through lead 38 to one terminal of a pilot lamp or light 13, the other terminal of the latter being connected through lead 39 to terminal 11. Pilot lamp 13 will indicate if heater element 17 is functioning or not, that is, it will remain lit if the heater element 17 stops functioning through a break in the resistance wire or a loose terminal.

The formula to determine condenser current may be stated as $$R_c = \frac{1}{2\pi f C}$$

where $R_c$ is the capacitive reactance of the condenser in ohms; $f$ is the frequency in cycles; and C is the capacitance in farads. At 60 cycles for a .02 mfd. condenser:

$$R_c = \frac{1}{2\pi f C} = \frac{1}{2 \times 3.1416 \times 60 \times .00000002} = 132,629$$

so that it can readily be seen by $$I = \frac{E}{R_c}$$

that the current at 110 volts passing through the condenser and fuse is indeed very small when the condenser is in workable condition.

When the condenser is shorted, the current that would pass through the condenser and fuse would be the total resistance of the circuit, which for all practical purposes would only be the resistance of the heating coil. For a 100 watt heater:

$$I = \frac{W}{E}$$

where I is the current in amperes, W is the wattage and E is the voltage. Assuming the voltage to be 110 volts, the $$I = \frac{100}{110} = .909 \text{ ampere}$$

By having a fuse of the proper value it could easily pass the normal current flowing through the condenser and fuse, but when the condenser is shorted and the thermostat switch contacts 20 and 21 open, the heater load of .909 ampere would flow through the fuse causing it to blow and thereby open the objectionable path which contains the shorted condenser 16 and thus permit the thermo-responsive electric switch 18 to continue to function normally.

It is understood that the values of the condenser, fuse and heater load are only given as examples, and that they may be varied according to circumstances.

Actually, the load across the fuse with the condenser blown would be in an A. C. circuit containing an inductive reactance due to the fact that the Nichrome heating element is wound in a coil and has some inductance. The reactance of the circuit can be determined by the formula $X_L = 2\pi f L$, where $X_L$ is the reactance in ohms, $f$ is the frequency and L is the inductance of the heater coil 17 in henries. However, at a low frequency, such as, 60 cycles and the low inductance of the heater coil 17, the load for all practical purposes may be considered a straight resistive load. The total impedance of the load may be computed from the formula $$\text{Impedance} = \sqrt{\text{resistance}^2 + \text{reactance}^2}$$

The immersion type heater herein comprises a preferably transparent heat resistant glass tube 40 having an enlarged neck 41 in engagement with the base or bottom portion 42 of housing 43, through the gasket 47. Base or bottom portion 42 of the housing 43 is connected to the top portion or cover 44 of the housing by the step-engagement 45 and maintained in such position by means of a screw 46. Top portion or cover 44 of housing 43 has three bosses 47, 48 and 49, pressing the neck of tube 40 into the gasket 47 and thus firmly securing tube 40 to housing 43. The top portion or cover 44 of the housing has an aperture 51 through which pilot lamp or light 13, which is located in top portion 44 of the housing may be viewed. Housing 43 has a hole 52 through which the inlet cable 53 containing the leads 26, 27 may pass into the housing 43. Top portion 44 of the housing has a recess 54 which together with a recess 55 in the thermostat base or mounting 56 houses a nut 57 threadedly receiving the adjusting screw 58 which bears against the hump on the thermostat's springy switch member 22, for adjusting the space or distance between the buttons or contacts 20, 21. Screw 58 has a knurled or serrated knob 59 for facilitating the adjustment. Knob 59 has an indicating pointer 60 for aiding the determination of the adjustment.

Base or bottom portion of housing 43 has an extension 61 which threadedly receives a screw 62. There are provided on base 42 protrusions (not shown) which bear against the tank 64 in conventional manner to draw together tightly the heater against the aquarium 64 at the latter's channelled rim 63. Within cover or top portion 42 of housing 43 there is located besides the pilot light 13; the resistor 14, fuse 15, and condenser 16. The thermostat base or switch mounting 56 rigidly engages the cover or top portion 42 of the housing 43, projects downwardly and has an opening through which bent switch member 22 protrudes. Member 22 is fixedly pivoted at 65 to the upper portion 56a of switch mounting or base 56, suspends downwardly as clearly seen in Fig. 2, and terminates in the contact point or button 21. The adjusting screw bears against the hump 22a of member 22, thus enabling contacts 20 and 21 to be brought closer together or farther apart. The bi-metal strip or switch member 19 is fixed on the base or mounting 56 (which is made of insulating material) by means of rivets 66. Leads 29 and 31 are split to enable portions of each lead to be disconnected from each other, this being brought about by the provision of conventional pins 67 and sockets 68. Thus, the heater unit may be readily separated from the thermostat unit for repair or other purposes. Heater 17 is conventional and has the heating coil 17a wound on the heat insulating block or base 17b. Fuse 15 and/or capacitor or condenser 16 may be located in tube 40 instead of cover 44 of housing 43 as seen in the drawing. Interposed between the bottom of the heating unit 17 and the bottom inner wall of the glass tube 40 is a disk, block or washer 69, preferably made of fiberglass, forming a cushion or shock absorber to prevent breakage during transportation.

From the foregoing it is seen that the device of the present invention accomplishes its intended objects and purposes and is adapted to meet practical conditions of use.

Although the present invention has been described in some detail by way of illustration and example for purposes of clarity of understanding, it is understood that certain changes and modifications may be made within

What is claimed as new and desired to be secured by Letters Patent is:

1. An immersion type electric heater comprising a tube closed at its bottom and open at its top, a support by which said tube is suspended from its top, a cover for said support, an electric heater unit within said tube, a temperature responsive electric switch including a vertically disposed elongated electrical insulating base connected to said cover and projecting within said tube above said heater unit, said switch further including a bi-metal member having one of its end portions secured to one end portion of said base and its other end unsecured, a humped metallic springy member having one of its end portions secured to the opposite end portion of said base and its other end unsecured, the unsecured end portions of said members being disposed opposite each other, means for adjusting the space between said unsecured end portions of said members, one of said members being electrically connected to a terminal of said heater unit and the other of said members being electrically connected to one terminal of an electric plug, the other terminal of said heater unit being in electrical connection with the other terminal of said plug, series connected lamp and resistor in said cover connected in parallel with said heater unit, a capacitor connected in a shunt circuit around said temperature responsive switch to minimize arcing thereof, and a fuse in said shunt circuit connected in series with said capacitor to open said shunt circuit upon the breaking down of said capacitor so as to leave the energization of said heater unit under the control of said temperature responsive switch.

2. An immersion type electric heater comprising a tube closed at one end and open at its other end, a support by which said tube is suspended from the open end, a cover for said support, an electric heater unit within said tube, a temperature responsive electric switch projecting within said tube above said heater unit, said switch comprising a bi-metal member and an electrically conducting member, said members having contactable elements opposite each other in spaced relation, means for adjusting the space between the said elements of said members, said heater unit and said members being in a circuit, a lamp in said cover connected in parallel with said heater unit, a capacitor connected in a shunt circuit around said temperature responsive switch to minimize arcing thereof, and a fuse in said shunt circuit connected in series with said capacitor to open said shunt circuit upon the breaking down of said capacitor so as to leave the energization of said heater unit under the control of said temperature responsive switch.

3. An immersion type electric heater comprising an electric heater unit, a temperature responsive electric switch, said heater unit and said switch being in a circuit, said switch comprising a bi-metal member and a metallic member, said members having contactable elements opposite each other in spaced relation, means for adjusting the space between said elements of said members, a lamp connected in parallel with said heater unit, a capacitor connected in a shunt circuit around said temperature responsive switch to minimize arcing thereof, and a fuse in said shunt circuit connected in series with said capacitor to open said shunt circuit upon the breaking down of said capacitor so as to leave the energization of said heater unit under the control of said temperature responsive switch.

4. In an immersion type electric heater for aquariums, an electric heating element, a temperature responsive electric switch connected to said element, said switch having a pair of contactable members, means to adjust the space between said members, a capacitor connected in a shunt circuit around said temperature responsive switch to minimize arcing between said contactable members of said switch, and a fuse in said shunt circuit connected in series with said capacitor to open said shunt circuit upon the breaking down of said capacitor so as to leave the energization of said heating element under the control of said temperature responsive switch.

5. An immersion type electric heater comprising a tube closed at its bottom end and open at its top end, a support by which said tube is suspended from its top portion, a cover for said support, an electric heater unit in the lower portion of said tube, a temperature responsive electric switch including a vertically disposed elongated electrical insulating base connected to said cover and projecting within said tube above said heater unit, conductor means electrically connecting said heater and said switch in an electric circuit, said switch further including a vertically disposed bi-metal member having its lower end portion secured to the lower end portion of said base and its upper end unsecured, a vertically disposed humped metallic springy member having its upper end portion secured to the upper portion of said base and its lower end unsecured, the unsecured end portions of said members being opposite each other and contactable, means for adjusting the space between the contactable portions of said members, said latter means comprising a nut in said cover and fixed against rotation by being located in a recess formed by adjacent cutouts in the upper portion of said base and said cover, a screw having a finger engaging element disposed over said cover and threadedly engaging said nut and engageable with the hump portion of said springy member; series connected lamp and resistor in said cover connected in parallel with said heater unit, a capacitor connected in a shunt circuit around said temperature responsive switch to minimize arcing between the contactable end portions of said members, and a fuse in said shunt circuit connected in series with said capacitor to open said shunt circuit upon the shorting of said capacitor so as to leave the energization of said heater unit under the control of said temperature responsive electric switch.

6. An immersion type electric heater for aquariums, comprising an electric heating element, a temperature responsive switch electrically connected in series to said heating element to regulate its temperature by controlling the flow of current thereto, a condenser connected in a shunt circuit around said temperature responsive switch to minimize arcing between the contacts of said switch, and a fuse in said shunt circuit connected in series with said condenser to open said shunt circuit upon the breaking down of said condenser so as to leave the energization of said heating element under the control of said temperature responsive switch.

References Cited in the file of this patent

UNITED STATES PATENTS

| Number | Name | Date |
|---|---|---|
| 1,930,264 | Curtis | Oct. 10, 1933 |
| 2,477,363 | Danner | July 26, 1949 |
| 2,488,454 | Wallace et al. | Nov. 15, 1949 |
| 2,576,688 | Landgraf | Nov. 27, 1951 |
| 2,666,838 | Krah et al. | Jan. 19, 1954 |